US008469413B2

(12) United States Patent
Novajovsky et al.

(10) Patent No.: US 8,469,413 B2
(45) Date of Patent: Jun. 25, 2013

(54) ADJUSTABLE STRIKER FOR VEHICLE DOOR LATCH

(75) Inventors: Andrew J Novajovsky, Grand Blanc, MI (US); Kenneth G. Danaj, Sterling Heights, MI (US); Glenn L. Traister, Shelby Township, MI (US); Henry J. Nykiel, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 176 days.

(21) Appl. No.: 12/900,528

(22) Filed: Oct. 8, 2010

(65) Prior Publication Data

US 2012/0086224 A1 Apr. 12, 2012

(51) Int. Cl.
*E05B 15/02* (2006.01)
*B60J 7/00* (2006.01)

(52) U.S. Cl.
USPC ......... 292/341.19; 292/341.15; 292/DIG. 53; 292/DIG. 60; 296/193.06

(58) Field of Classification Search
USPC .......... 292/340, 341, 341.12, 341.13, 341.14, 292/341.15, 341.18, 341.19, DIG. 51, DIG. 53, 292/DIG. 55, DIG. 60; 296/146.9, 193.06, 296/202, 203.03; 411/103, 81, 84, 102, 104, 411/105, 111, 112, 171, 965
See application file for complete search history.

(56) References Cited

U.S. PATENT DOCUMENTS 58,929 A * 10/1866 Wood ....................... 292/341.19
633,918 A * 9/1899 Smith ...................... 292/341.19
749,818 A * 1/1904 Hamel ..................... 292/341.19
1,059,530 A * 4/1913 Dupuis ..................... 292/341.19
1,295,458 A * 2/1919 Erffmeyer ................ 292/341.19
2,156,874 A * 5/1939 Schonitzer .................... 292/216
2,381,233 A * 8/1945 Mills ............................... 411/84
2,401,854 A * 6/1946 Berry, Jr ................. 292/341.19
2,409,209 A * 10/1946 Johnson ........................ 411/111
2,542,375 A * 2/1951 Torresen ......................... 411/84
2,669,477 A * 2/1954 Jewell ...................... 292/341.18
2,795,452 A * 6/1957 Schamel ....................... 292/340
2,825,380 A * 3/1958 Reiner .......................... 411/113
3,123,120 A * 3/1964 Grimm et al. ................. 411/111
3,136,206 A * 6/1964 Adams .......................... 411/546
3,219,085 A * 11/1965 Zahodiakin ................... 411/112
3,219,086 A * 11/1965 Zahodiakin ................... 411/112
3,219,089 A * 11/1965 Zahodiakin ................... 411/113
3,556,570 A * 1/1971 Cosenza ....................... 411/176
3,695,324 A * 10/1972 Gulistan ....................... 411/111

(Continued)

OTHER PUBLICATIONS

Photos of Prior Striker Brackets.

*Primary Examiner* — Carlos Lugo
*Assistant Examiner* — Alyson M Merlino

(57) ABSTRACT

An anchor plate assembly adjustably mounts a striker on the vehicle pillar. The striker has a striker base with apertures for receiving mounting bolts that will extend though oversized apertures in the pillar. An anchor base has a base plate for engagement with the pillar and bolt slots in the base plate for alignment with the oversized apertures in the pillar. An anchor slide has a slide plate mounted for vertical sliding movement on the base plate. The slide plate has nuts thereon aligned with the oversized apertures of the pillar. The nuts receive the mounting bolts so that when the mounting bolts are loose the striker together with the anchor slide can be adjusted vertically until tightening of the mounting bolts effectively clamps the slide plate of the anchor slide against the base plate of the anchor base to maintain the striker at the vertically adjusted position.

6 Claims, 3 Drawing Sheets

U.S. PATENT DOCUMENTS

| | | | | | |
|---|---|---|---|---|---|
| 4,193,435 | A | * | 3/1980 | Frosch et al. | 411/113 |
| 4,227,561 | A | * | 10/1980 | Molina | 411/103 |
| 4,323,271 | A | * | 4/1982 | Taniguchi | 292/341.18 |
| 4,432,575 | A | * | 2/1984 | Garvey et al. | 292/341.18 |
| 4,756,565 | A | | 7/1988 | Myslicki | |
| 4,826,374 | A | * | 5/1989 | Baglin | 411/103 |
| 4,863,327 | A | * | 9/1989 | Poupiter | 411/112 |
| 4,895,484 | A | * | 1/1990 | Wilcox | 411/85 |
| 5,096,350 | A | * | 3/1992 | Peterson | 411/12 |
| 5,137,406 | A | * | 8/1992 | Cosenza | 411/113 |
| 5,193,643 | A | * | 3/1993 | McIntyre | 180/312 |
| 5,193,868 | A | * | 3/1993 | O'Toole | 292/341.15 |
| 6,073,980 | A | | 6/2000 | Arabia | |
| 6,257,632 | B1 | * | 7/2001 | Jung et al. | 292/341.18 |
| 6,616,204 | B1 | * | 9/2003 | Mitts et al. | 292/341.18 |
| 6,758,645 | B2 | * | 7/2004 | Curley et al. | 411/111 |
| 6,814,401 | B2 | * | 11/2004 | Takada | 296/202 |
| 6,979,158 | B2 | * | 12/2005 | Clinch et al. | 411/112 |
| 7,156,599 | B2 | * | 1/2007 | Clinch et al. | 411/111 |
| 7,641,428 | B2 | * | 1/2010 | Tucker, II | 411/104 |
| 2004/0119300 | A1 | * | 6/2004 | Strable et al. | 292/341.18 |
| 2007/0243039 | A1 | * | 10/2007 | Johnson et al. | 411/111 |

* cited by examiner

ADJUSTABLE STRIKER FOR VEHICLE DOOR LATCH

FIELD OF THE INVENTION

The present invention relates to a vehicle door latch and more particularly to mounting a striker assembly on a door pillar in a manner permitting vertical and cross-car adjustment of the striker assembly.

BACKGROUND OF THE INVENTION

Automotive vehicles are typically equipped with a door latch in the end of each door that engages a striker assembly that is secured to a vehicle door pillar at the edge of the door opening. The latch has a fish mouth slot that opens toward the vehicle interior through a cutout in the face plate of the latch housing. As the door closes, the fish mouth slot swallows a striker pin provided on the striker assembly, and the striker pin "strikes" or engages an internal, pivotally mounted fork bolt lever that is part of a latching mechanism located inside the latch housing. The fork bolt lever is pivoted to a latched position where the fork bolt lever wraps around the striker pin and closes off the fish mouth slot. This establishes the closed position of the door. The fork bolt lever is typically held in the latched position by a detent lever that is released by a door handle in order to open the door.

In order to obtain proper latching of the door in the closed position, and in order to provide a proper positioning of the closed door within the door opening of the vehicle body, it is necessary that the striker pin of the striker assembly be precisely located in both the vertical direction and in the cross-car direction. The vertical location of the striker panel will determine whether the door sags within the door opening. The cross-car location of the striker pin will determine whether the outer surface of the door is flush with the outer surface of the vehicle body.

Accordingly it would be desirable to provide a new and useful anchor assembly for promoting the adjustability of a striker in a motor vehicle door latch system in both the cross-car direction and the vertical direction.

SUMMARY OF THE INVENTION

An anchor plate assembly adjustably mounts a striker on the vehicle pillar. The striker has a striker base with apertures for receiving mounting bolts that will extend though oversized apertures in the pillar. The anchor plate assembly includes an anchor base that has a base plate for engagement with the pillar and bolt slots in the base plate for alignment with the oversized apertures in the pillar. An anchor slide has a slide plate mounted for vertical sliding movement on the base plate. The slide plate has nuts thereon aligned with the oversized apertures of the pillar. The nuts receive the mounting bolts so that when the mounting bolts are loose, the striker together with the anchor slide can be adjusted vertically until tightening of the mounting bolts effectively clamps the slide plate of the anchor slide against the base plate of the anchor base to maintain the striker at the vertically adjusted position.

Further areas of applicability of the present invention will become apparent from the detailed description provided hereinafter. It should be understood that the detailed description and specific examples, while indicating exemplary embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EXEMPLARY EMBODIMENTS

The following description of certain exemplary embodiments is merely exemplary in nature and is not intended to limit the invention, its application, or uses.

Figure 1:
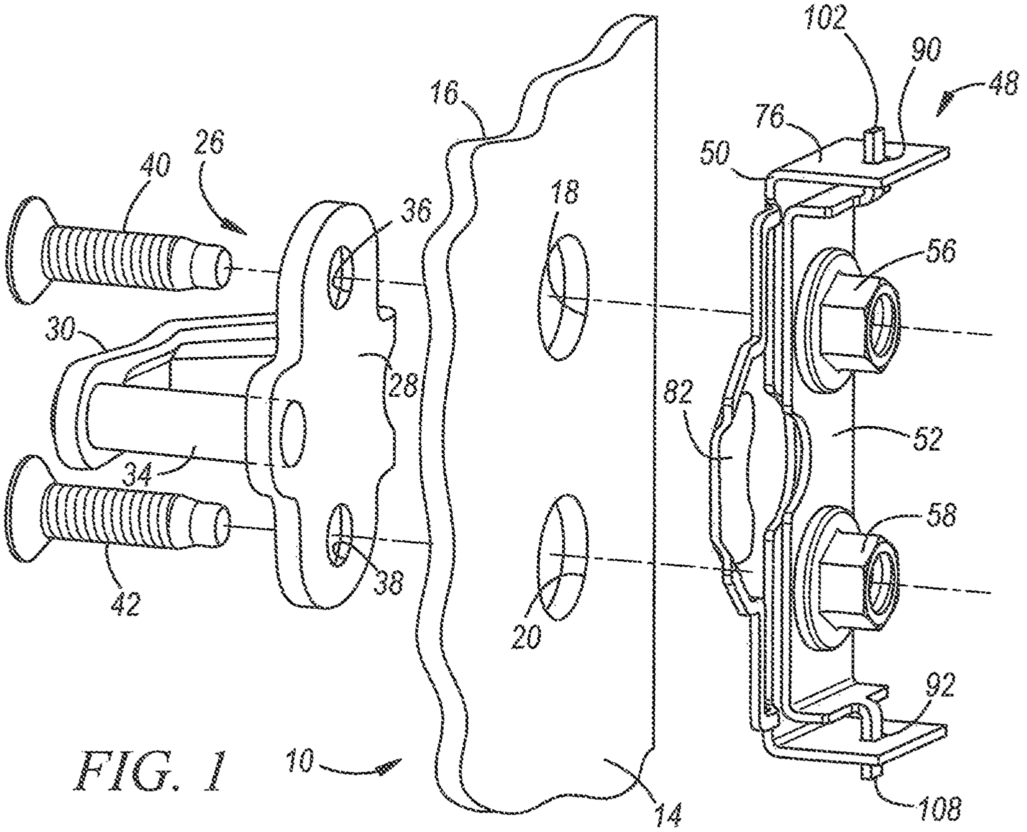
FIG. 1 is an exploded perspective view showing a striker assembly ready for mounting on a vehicle pillar by an anchor plate assembly.

Referring to FIG. 1, it is seen that a conventional pillar, generally indicated at 10, is made of stamped steel and has inner pillar face 14 and an outer pillar face 16. A first oversized aperture 18 and a second oversized aperture 20 are provided in the pillar 10, and located one above the other.

A striker assembly, generally indicated at 26, is provided for mounting onto the pillar 10 and includes a striker base 28 that will engage against the outer pillar face 16 of the pillar 10. The striker base 28 includes an integral arm 30. A striker pin 34 has one end that is swaged or welded to the striker base 28 and another end that is swaged, welded, screwed, or otherwise attached to the arm 30 of the striker base 28. Bolt holes 36 and 38 are provided in the striker base 28 and register with the first and second oversized apertures 18 and 20 of the pillar 10. Mounting bolts 40 and 42 fit closely within the diameter of the bolt holes 36 and 38. Pillar 10 is shown as a single layer of metal but may be reinforced as necessary.

An anchor plate assembly, generally indicated at 48, will be mounted on the inner pillar face 14 of the pillar 10 as will be discussed more particularly hereinafter to receive the mounting bolts 40 and 42 of the striker assembly 26. The anchor plate assembly 48 is comprised of an anchor base 50 and an anchor slide 52. An interconnecting slide mechanism is provided between the anchor base 50 and the anchor slide 52, as will be discussed hereinafter. The anchor slide 52 has a pair of nuts 56 and 58 mounted thereon that register with the first and second oversized apertures 18 and 20 of the pillar 10. The nuts 56 and 58 can be any known type of nuts, such as clinch nuts, extruded nuts, etc.

Figure 2:
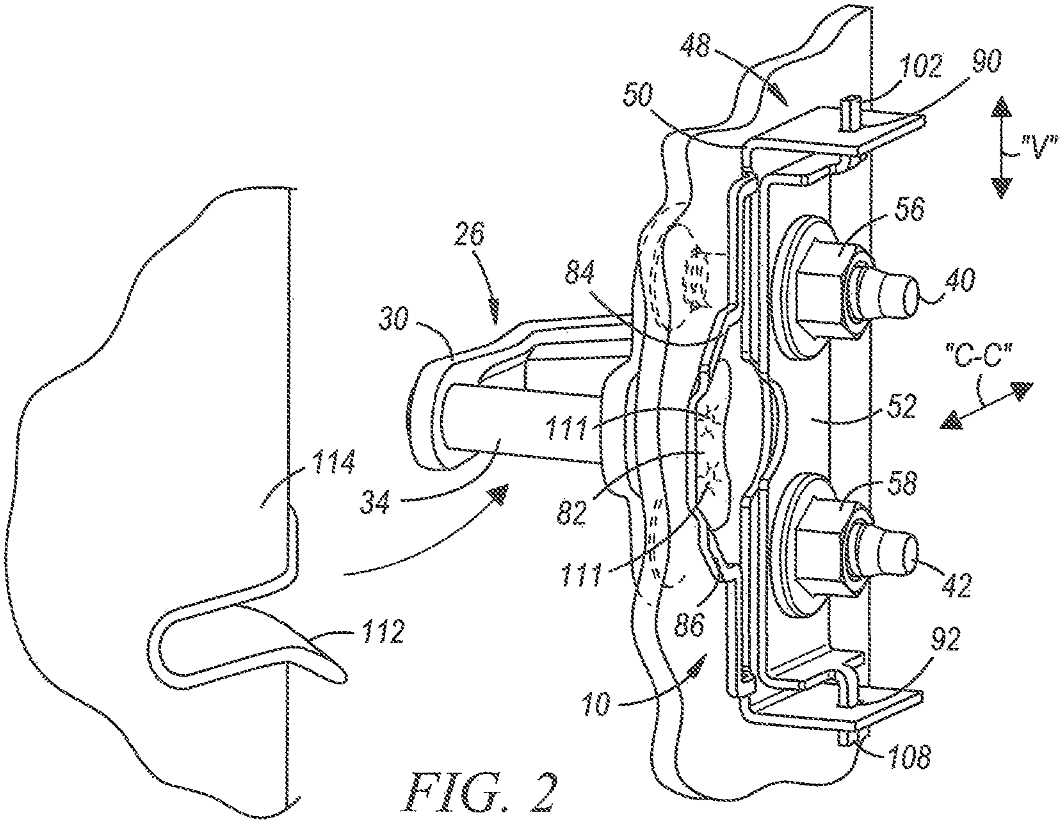
FIG. 2 is a view similar to FIG. 1 but showing the components of FIG. 1 assembled together and showing the door latch poised to close upon the striker assembly.

FIG. 2 shows the striker assembly 26 in its final mounted position on the pillar 10. In particular, FIG. 2 shows that the anchor plate assembly 48 has been installed onto the inner pillar face 14 of the pillar 10 and the bolts 40 and 42 have been inserted through the holes 36 and 38 of the striker assembly 26, through the oversized apertures 18 and 20 of pillar 10, and threaded into the nuts 56 and 58.

Figure 3:
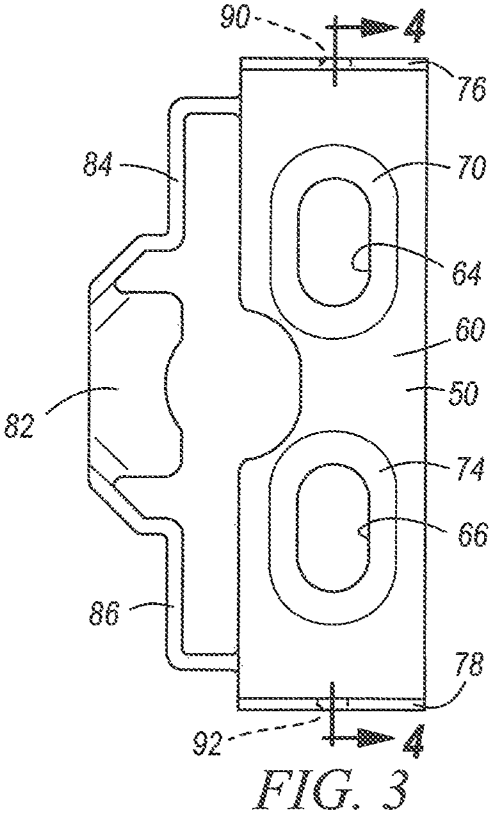
FIG. 3 is a frontal elevation view of an anchor base of the anchor plate assembly.
Figure 4:
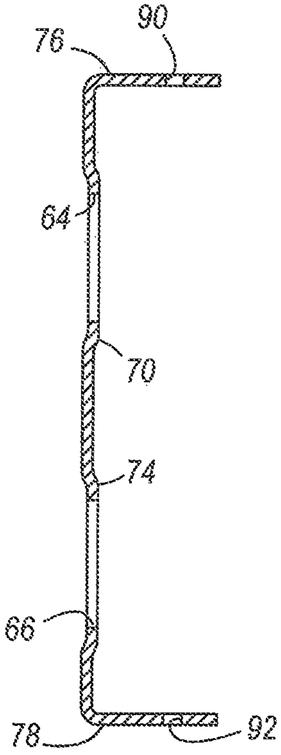
FIG. 4 is a section view taken in the direction of arrows 4-4 of FIG. 3.

FIGS. 3, 4, 5, and 6 show the construction of the anchor base 50 and anchor slide 52 of the anchor plate assembly 48 in greater detail. As seen in FIGS. 3 and 4 the anchor base 50 includes a base plate 60 for engagement against the pillar inner face 14. The base plate 60 has a pair of bolt slots 64 and 66 that may be elongated in the vertical direction, or may be rounded and oversized similar to the oversized apertures 18 and 20 of the pillar 10. As seen in FIGS. 3 and 4, these bolt slots 64 and 66 can be formed within optional raised bosses 70 and 74 provided on the base plate 60. The anchor base 50 also has an upturned upper flange 76 at its upper end and an upturned lower flange 78 at its lower end. Anchor base 50 also has a mounting tab 82 that is integrally connected with the base plate 60 by deformable links 84 and 86. The anchor base 50 is preferably formed in a stamping operation so that the base plate 60, the flanges 76 and 78, the deformable links 84 and 86, and the mounting tab 82 are all integrally connected and formed as a single piece construction. As best seen in FIG. 4, the upper flange 76 has a slot 90 formed therein and the lower flange 78 has a similar slot 92 formed therein.

Figure 5:
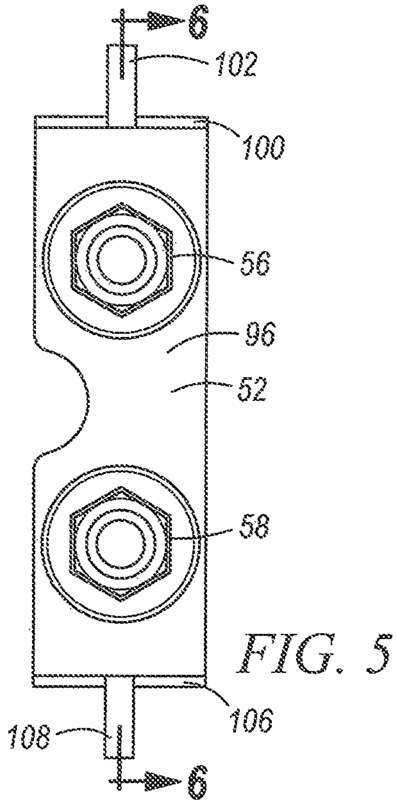
FIG. 5 is a frontal elevation view of an anchor slide plate of the anchor plate assembly.
Figure 6:
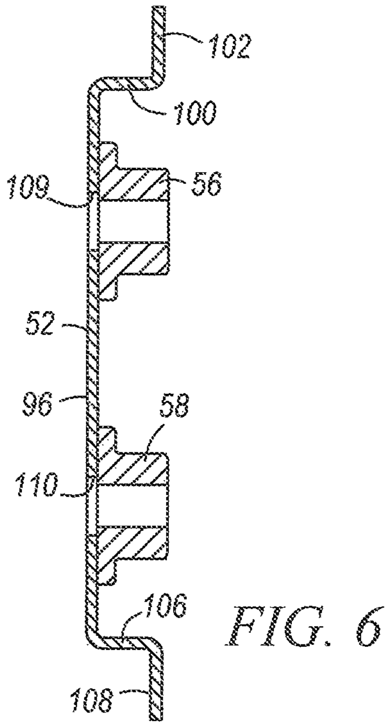
FIG. 6 is a section view taken in the direction of arrows 6-6 of FIG. 5.

Referring to FIGS. 5 and 6, the anchor slide 52 is a stamping having a slide plate 96 that will engage and slide upon the raised bosses 70 and 74 of the anchor base 50. As seen in FIGS. 5 and 6, an upper flange 100 is formed at the upper end of the slide plate 96 and has an upper tab 102 extending upwardly therefrom. Similarly, a lower flange 106 is provided at the lower end of the slide plate 96 and has a lower tab 108 extending vertically downward. The nuts 56 and 58 are welded to the slide plate 96 and align respectively with bolt holes 109 and 110 provided in the slide plate 96.

Referring again to FIG. 1, it is seen that the anchor plate assembly 48 has been assembled together by joining the anchor slide 52 to the anchor base 50, forming an interconnecting slide mechanism by which the anchor slide 52 can slide vertically relative to the anchor base 50. In particular, as seen in FIG. 1, the upper tab 102 of the slide plate 84 extends through the slot 90 of the anchor base 50, and the lower tab 108 of the anchor slide 52 extends through the slot 92. In addition, the slide plate 96 can slide vertically up and down as permitted by the sliding of the tabs 102 and 108 within the slots 90 and 92. The tabs and the slots are sized for close fitting sliding engagement so that the sliding movement is limited to the vertical direction which is shown by the arrow "V" in FIG. 2.

Installation

Referring again to FIG. 1 the anchor plate assembly, generally indicated at 48, will be positioned against the pillar inner face 14 so that the mounting tab 82 will also be positioned against the pillar inner face 14. Next, the mounting tab 82 is permanently attached to the pillar 10, preferably by making one or more electric resistance spot welds 111 between the mounting tab 82 and the pillar 10 as shown in FIG. 2. Alternatively, however, adhesives or mechanical fasteners can be employed to attach the mounting tab 82 to the pillar 10. Once the mounting tab 82 is attached to the pillar 10, it will be understood that the location of the anchor plate assembly 48 on the pillar 10 will be determined by the condition of the deformable links 84 and 86. The oversized apertures 18 and 20 of pillar 10 are of a larger diameter than the bolt holes through the nuts 56 and 58 so that the nuts 56 and 58 will be aligned with the oversized apertures 18 and 20 regardless of the exact positioning of the anchor plate assembly 48 by the welding of the tab 82 to the pillar 10.

After the anchor plate assembly 48 has been permanently affixed to the pillar 10 as described above, the vehicle body can then be processed through the normal paint system where the vehicle body will be dipped into a tank where a primer will evenly coat the entire surface of the vehicle body, including the pillar 10 and the anchor plate assembly 48. During the submersion in the primer bath, the bosses 70 and 74 of the anchor base 50 will space the anchor slide 52 away from the adjoining face of the anchor base 50 so that the liquid primer material is free to flow into the space between the anchor base 50 and the anchor slide 52. If the bosses 70 and 74 are not provided in the anchor base 50, the tabs 102 and 108, and the slots 90 and 92 can be located to provide a small space between the anchor base 50 and the anchor slide 52 for flow of the primer.

After the painting of the vehicle body, the vehicle doors will be installed. If needed, the cross-car location of the anchor plate assembly 48 can be adjusted by applying force to the anchor plate assembly 48 such that the deformable links 84 and 86 will be bent to adjust the anchor plate assembly 48 in the cross-car direction shown by the arrow designated "C-C" in FIG. 2.

Next, the striker assembly 26 is mounted onto the anchor plate assembly 48 by installing the bolts 40 and 42. Bolts 40 and 42 reach through the bolt holes 36 and 38, through the oversize apertures 18 and 20 of the pillar 10, through the elongated slots 64 and 66 of the anchor base 50, and are threaded into the nuts 56 and 58. The bolts 40 and 42 are preferably lightly tightened so that the components are held together, and yet, if sufficient force is applied to the striker assembly 26, the anchor slide 52 will be able to move up or down in the vertical direction of the arrow designated V in FIG. 2 relative to the anchor base 50. It will be understood that the design diameter of the oversized apertures 18 and 20 in the pillar will accommodate the adjustment of the mounting bolts 40 and 42 in both the vertical direction and the horizontal cross-car direction.

FIG. 2 shows a fragment of the vehicle door and particularly a fish mouth opening 112 of a door latch 114. As the door is closed against the pillar 10, the fish mouth opening 112 of the door latch 114 will swallow the striker pin 34. The preferred manner for properly adjusting the striker assembly 26 on the pillar 10 will be to close the door onto the striker assembly 26 so that the fish mouth opening 112 of the door latch 114 will engage with the striker pin 34 and then forcibly move the striker pin 34 up or down to properly match the vertical position of the door latch 114 on the door. If the striker assembly 26 is moved up or down by the door latch 114, the anchor plate 52 will follow along and be moved vertically up or down on the anchor base 50 as permitted by the sliding of the tabs 102 and 108 within the slots 90 and 92. Then, with the striker assembly 26 and the anchor slide 52 having reached the proper vertical position, the door is opened and the assembly operator will fully tighten the bolts 40 and 42. In addition, if a cross-car adjustment is needed, the deformable links 84 and 86 can be bent to allow the entire anchor plate assembly 48 to be moved in or out in the horizontal cross-car direction C-C as needed. It will be understood that once the bolts 40 and 42 are fully tightened, the anchor slide 52 will be tightly clamped against the bosses 70 and 74 of the anchor base 50 and the anchor base 50 itself will be tightly clamped against the inner pillar face 14 while the striker base 28 is tightly clamped against the pillar outer face 16. If needed, the tabs 102 and 108 can bend to permit the tight clamping of the anchor slide 52 against the anchor base 50.

Referring again to FIG. 1, it is seen that the anchor plate assembly 48 is conveniently shipped from the manufacturing plant to the vehicle assembly plant as a one piece unit. In particular, the tabs 102 and 108 of the anchor slide 52 that extend through the slots 90 and 92 of the anchor base 50 serve to retain the anchor base 50 and the anchor slide 52 together during shipment as well as provide an interconnecting slide mechanism between the anchor base 50 and the anchor slide 52. In addition, as described above, the tabs 102 and 108 fit closely within the size of the slots 90 and 92 so that the motion of the anchor slide 52 relative the anchor base 50 is only in the vertical direction. A person of ordinary skill in the art will recognize that alternative structures can be readily designed that would couple the anchor base 50 and the anchor slide 52 together for shipment and handling, while at the same time creating an interconnecting slide mechanism permitting and defining a vertical adjusting movement of the anchor slide 52 on the anchor base 50. For example, the bolt slots 64 and 66 of the anchor base 50 can have a width that is closely matched to the diameter of the mounting bolts 40 and 42 so that the bolt slots 64 and 66 will function to define the path of the vertical movement of the anchor slide 52 on the anchor base 50. In addition, the vertical length of the elongated bolt slots 64 and 66 can serve to limit the extent of the vertical movement of the anchor slide 52 in the up and down vertical directions. And then, if the bolt slots 64 and 66 are used to define and limit the vertical movement, the tabs 102 and 108 can be replaced by some alternative structure acting between the anchor base in the slide anchor to connect these parts together for shipment and handling until such time as the mounting bolts 40 and 42 are installed into the nuts 56 and 58.

It will be also recognized that although the oversized apertures 18 and 20 shown in FIG. 1 are of a rounded shape, these apertures could also be rectangular in shape or oval in shape as needed to accommodate the anticipated range of vertical and horizontal adjustment of the striker assembly 26.

Additional Embodiments

Figure 7:
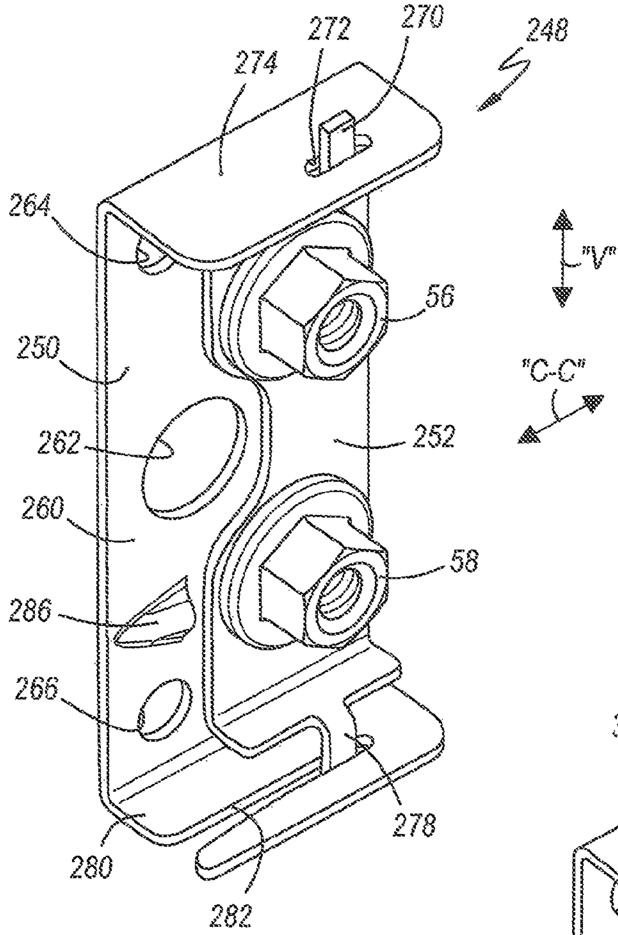
FIG. 7 is a perspective view of a second embodiment of the anchor plate assembly of the invention.

Referring to FIG. 7, another embodiment of the anchor plate assembly is shown, and has an alternative interconnecting slide mechanism between the anchor base and the anchor slide. In particular, an anchor plate assembly 248 includes an anchor base 250 and an anchor slide 252. The anchor base 250 has a base plate 260. Hole 262 is provided in the base plate 260 to receive weld material for welding the base plate 260 to the vehicle pillar. In addition locating holes 264 and 266 are provided in the base plate 260 for use in locating the base plate 260 on the pillar. In the embodiment of FIG. 7, the anchor slide 252 has tab 270 extending therefrom similar to the tab 102 of the FIGS. 1-6. In FIG. 7 the tab 270 extends through a slot to 272 provided in a flange 274 of the base plate 260. The slot 272 is wider than the slot 102 provided in FIGS. 1 through 6 so that the tab 270 can move in the cross-car direction C-C.

The lower end of the anchor slide 252 has a tab 278 similar to the tab 108 of the FIGS. 1-6. The lower end of base plate 250 has a flange 280 with an open- end slot 282. After the upper tab 270 has been fitted into the slot 272, the lower tab 278 can be slid sideways through the open-end slot 282 to assembled position shown in FIG. 7. FIG. 7 also shows that a detent abutment 286 has been struck from the base plate 250. During the sliding of the tab 278 into the open-end slot 282, the anchor slide 252 will ride over the detent abutment 286. The detent abutment 286 is spaced a certain distance from the anchor slide 252 so that the lower end of the anchor slide 252 can slide in the cross-car direction C-C.

Accordingly, in comparing the embodiment of FIG. 7 with the embodiment of FIGS. 1-6, it will be appreciated that in FIG. 7 the cross-car adjustment of the nuts 56 and 58 will be obtained by the cross-car sliding of the upper tab 270 within the width of the slot 270 and the cross-car sliding of the tab 278 within the open-end slot 282 to an extent that is limited by the engagement with the detent abutment 286.

Figure 8:
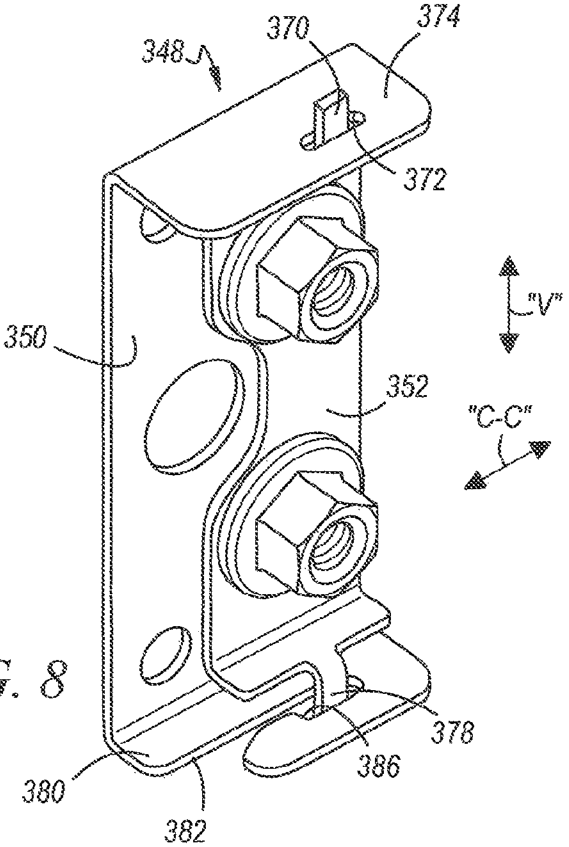
FIG. 8 is a perspective view of a third embodiment of the anchor plate assembly of the invention.

FIG. 8 shows a third embodiment of the anchor plate assembly, and has an alternative interconnecting slide mechanism between the anchor base and the anchor slide. In FIG. 8, an anchor plate assembly, generally indicated at 348 includes an anchor base 350 and an anchor slide 352. The upper end of the anchor slide 352 has a tab 370 that can slide in both a vertical direction in a cross-car direction within a slot 372 provided in flange 374 of anchor base 350.

The anchor slide 352 also has a lower tab 378 that is slid sideways through an open-end slot 382 and will snap past a detent abutment 386 provided on the flange 380 of the anchor base 350. The detent abutment 386 will retain the tab 378 against removal through the open-end slot 382 but permit the lower end of the anchor slide 352 to be adjusted in the cross-car direction. The upper tab 372 can slide in the cross-car direction to an extent defined by the width of the slot 372 in the upper flange 374.

In view of the foregoing the invention has provided a new and useful anchor assembly for promoting the adjustability of a striker in a motor vehicle door latch system in both the cross-car direction and the vertical direction.

What is claimed is:

1. An anchor plate assembly for adjustably mounting a striker on an outer pillar face of a vehicle pillar that also has an inner pillar face, said striker having a striker base with apertures for receiving mounting bolts that will extend though oversized apertures in the pillar, comprising:

an anchor base having a base plate for engagement with the pillar and bolt slots provided in the base plate for alignment with the oversized apertures in the pillar;

an anchor slide having a slide plate having nuts thereon aligned with the oversized apertures of the pillar, said nuts receiving the mounting bolts;

and in an interconnecting slide mechanism mounting the anchor slide on the anchor base for sliding movement thereon in both a vertical direction and a cross-car horizontal direction until tightening of the mounting bolts effectively clamps the slide plate of the anchor slide against the base plate of the anchor base to maintain the striker at a vertically adjusted position and a cross-car adjusted position;

said interconnecting slide mechanism including, a first tab carried by the anchor slide and fitted into a first slot provided in the anchor base, said first slot permitting movement of the first tab in the vertical direction within the first slot and the first slot also having a width permitting limited movement of the first tab in the horizontal cross-car direction within the first slot;

a second tab carried by the anchor slide and an open-end slot provided in the anchor base, said open-end slot permitting the second tab to be slid sideways in the cross car horizontal direction into the open-end slot during assembly of the anchor slide to the anchor base;

and a detent abutment provided on the anchor base, said anchor slide riding over the detent abutment as the second tab is slid sideways into the open-end slot during assembly of the anchor slide to the anchor base, the detent abutment being engaged by the anchor slide to limit the movement of the anchor slide in the cross-car horizontal direction and prevent removal of the second tab from the open-end slot after the anchor slide has been assembled to the anchor base.

2. The anchor plate assembly of claim 1 further comprising the detent abutment being an abutment provided on the anchor base that extends into the open-end slot to be engaged by the second tab during assembly of the anchor slide to the anchor base and prevent removal of the second tab from the open-end slot after the anchor slide has been assembled to the anchor base.

3. The anchor plate assembly of claim 1 further comprising the detent abutment being an abutment struck from the base plate of the anchor base for engagement by the slide plate to prevent removal of the second tab from the open-end slot.

4. The anchor plate assembly of claim 1 further comprising the anchor base having upper and lower flanges thereon, the first slot and the open-end slot being provided on the flanges of the anchor base, and the first and second tabs extending respectively through the first slot and the open-end slot provided on the flanges of the anchor base.

5. The anchor plate assembly of claim 1 further comprising the anchor base having upper and lower flanges thereon, the first slot and the open-end slot being provided on the flanges of the anchor base, and the first and second tabs extending respectively through the first slot and the open-end slot provided on the flanges of the anchor base, and the detent abutment being an abutment struck from the base plate of the anchor base for engagement by the slide plate to prevent removal of the second tab from the open-end slot.

6. The anchor plate assembly of claim 4 further comprising the detent abutment being provided on the flange having the open-end slot and the second tab engaging the detent abutment to prevent removal of the second tab from the open-end slot.

* * * * *